United States Patent Office
3,320,313
Patented May 16, 1967

3,320,313
PREPARATION OF HALOGENATED
CARBANILIDES
John Frederick Herber, Clayton, Mo., assignor to Monsanto Company, St. Louis, Mo., a corporation of Delaware
No Drawing. Filed June 12, 1964, Ser. No. 374,827
10 Claims. (Cl. 260—553)

This invention relates generally to the preparation of carbanilides. More particularly, this invention is concerned with a novel and improved process for making such compounds from aromatic amines and isocyanates.

It is known that halogenated carbanilides can be prepared by the reaction of a halogenated aromatic amine with a halogenated aromatic isocyanate. The reaction takes place in an anhydrous solvent. Such practices in the prior art are illustrated, for example, by United States Patents 2,818,390, 2,846,398 and 2,983,646. In accordance with such patents, a halogenated aniline and a halophenyl isocyanate are reacted together in an inert organic solvent. The solvents disclosed in the art are the relatively low boilers such as diethyl ether, other symmetrical and mixed dialkyl ethers, and the liquid alkanes. Further, the known processes are carried out at reaction temperatures between room temperature and the reflux temperature of the system.

Is is also known in the prior art that the halogenated carbanilides are particularly useful in controlling the growth of various bacterial and fungal organisms. Said carbanilides are employed as antiseptic components in toilet soaps, cosmetic preparations, medicinal ointments and laundry detergents. In addition, these compounds are used as anthelmintics for the control of endoparasites in domestic animals. As should be readily apparent from the nature of such utilizations, the halogenated carbanilides possess the requisite non-irritating and non-toxic properties. However, when prepared by the methods of the prior art, the carbanilides are found to contain a quantity of residual or unreacted chloroaniline. This material is highly toxic and is a dangerous skin and eye irritant. Consequently, it is a constant problem to remove all of said chloroaniline from the desired carbanilide, or to reduce the concentration of the chloroaniline to a level at which it is no longer of concern.

It is, therefore, an object of this invention to provide an improved process for preparing halogenated carbanilides from halogenated anilines and halophenyl isocyanates.

More specifically, it is an object of this invention to provide such a process wherein the residual or unreacted chloroaniline in the reaction product is kept at an extremely low level. Another object of the invention is to achieve said low level of chloroaniline without reducing the yield of the desired carbanilide product.

These and other objects, advantages and features of the invention will become apparent upon consideration of the following detailed description thereof.

Carbanilides which are prepared by the process of this invention have the formula,

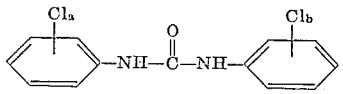

wherein $a$ is an integer from 1 to 3, and $b$ is an integer from 2 to 3. Such compounds are produced by reacting an amine of the formula

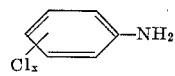

with an isocyanate of the formula

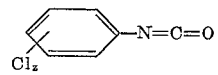

wherein $x$ and $z$ are each integers from 1 to 3, and the sum of $x$ plus $z$ is at least 3.

In accordance with this invention, each of the reactants is added to the reaction vessel in the form of a solution in o-dichlorobenzene. In addition, it is preferred that, prior to adding said reactants, said vessel be charged with a relatively small amount or heel of o-dichlorobenzene. Such a heel may be up to about 20% of the total volume of the reactants. It will be understood that the volume of solvent in the heel, and the amount of solvent used for each of the reactants, will vary dependent upon the particular amine and isocyanate employed. In any event, the total quantity of o-dichlorobenzene for any given reaction should be such as to insure that the reaction mixture is a readily stirrable slurry.

Also in accordance with this invention, the o-dichlorobenzene solutions of the two reactants are added substantially simultaneously to the reaction vessel. The reaction temperature employed is from about 100° C. to about 170° C. It is particularly preferred to employ a temperature in the range of 140° C. to 155° C., and, as should be apparent, the specific temperature will be dependent upon the individual reactants.

It has been found that the process defined herein will regularly produce the desired carbanilide in yields in excess of about 95%. Further, the carbanilide products are found to contain less than 50–100 parts per million of the undesirable chloroaniline. In order to demonstrate the improvements of the instant process, a series of tests are made with different reactants and solvents, and also using different modes of addition. The stoichiometric relationship between quantities of reactants is maintained in all tests.

Test A.—A 50% solution of p-chlorophenyl isocyanate is charged to a reaction vessel. The solution is stirred under a nitrogen atmosphere and heated to the desired temperature. A 50% solution of 3,4-dichloroaniline is then added over a 4-hour period. After such addition is complete, the reaction mixture is held at said temperature for one hour, cooled to 0–5° C., and centrifuged. The centrifuge cake is washed with 100 ml. of solvent and dried in a vacuum oven. The results of these reactions are listed in Table I.

TABLE I

| Solvent | Temperature, °C. | Yield, percent | Chloroaniline, p.p.m. |
|---|---|---|---|
| Monochlorobenzene | 50–55 | 97.5 | 1,000 |
| o-Dichlorobenzene | 50–55 | 90.5 | 1,355 |
| 1,2-dichloroethane | 84 | 85.0 | 2,450 |
| o-Dichlorobenzene | 150 | 99.5 | 98 |
| Monochlorobenzene [1] | 50 | 99.5 | 1,005 |

[1] 1% triethylamine catalyst added after all of 3,4-dichloroaniline.

Test B.—A reaction vessel is charged with 145.20 grams of solvent, and said solvent is heated to the desired temperature under a nitrogen atmosphere. A solution of 76.79 grams of p-chlorophenyl isocyanate in 91.0 grams of solvent is prepared, and a solution of 81.01 grams of 3,4-dichloroaniline in 91.0 grams of solvent is also prepared. The two solutions are added to the reaction vessel uniformly and substantially simultaneously, at the desired temperature, over a 4-hour period. After such addition is complete, the reaction mixture is held at said temperature for one hour, cooled to 0–5° C., and centrifuged. The centrifuge cake is washed with 100 cc.

of solvent and dried in a vacuum oven. The results of these reactions are listed in Table II.

TABLE II

| Solvent | Temperature, °C. | Yield, percent | Chloroaniline, p.p.m. |
|---|---|---|---|
| Monochlorobenzene | 50–55 | 94.0 | 2,180 |
| Do | 50–55 | 97.0 | 300 |
| Do | 100–105 | 97.7 | 278 |
| Do | 132 | 93.5 | 715 |
| Tetrahydrofuran | 50 | 76.8 | 256 |
| Do | 50 | 95.7 | 555 |
| Di-n-butyl ether | 130–136 | 95.8 | 170 |
| o-Dichlorobenzene | 50 | 99.5 | 695 |
| Do | 125 | 97.5 | 85 |
| Do | 140 | 99.5 | 20 |
| Do | 150 | 99.5 | 38 |
| Do | 150 | 97.5 | 33 |
| Do | 150 | 99.5 | 25 |
| Do | 150 | 98.6 | 45 |

*Test C.*—The procedure of Test A is followed except that a solution of p-chloroaniline is added to a solution of 3,4-dichlorophenyl isocyanate. The results are listed in Table III.

TABLE III

| Solvent | Temperature, °C. | Yield, percent | Chloroaniline, p.p.m. |
|---|---|---|---|
| Monochlorobenzene | 50 | 97.5 | 615 |
| Do¹ | 50 | 81.2 | 630 |
| Do | 100 | 96.4 | 363 |
| Do¹ | ²50 | 99.5 | 470 |
| Do¹ | 100 | 99.0 | 115 |
| o-Dichlorobenzene | 100 | | 310 |

¹ 1% triethylamine catalyst added after all of p-chloroaniline.
² Temperature raised to 100° C. after all reactants and catalyst are added.

*Test D.*—The procedure of Test B is followed except that solutions of p-chloroaniline and 3,4-dichlorophenyl isocyanate are used. The results are listed in Table IV.

TABLE IV

| Solvent | Temperature, °C. | Yield, percent | Chloroaniline, p.p.m. |
|---|---|---|---|
| Monochlorobenzene | 50 | 94.5 | 158 |
| o-Dichlorobenzene | 150 | 99.0 | 17 |

While the invention has been described herein with regard to certain specifiic embodiments, it is not so limited. It is to be understood that variations and modifications thereof may be made by those skilled in the art without departing from the spirit and scope of the invention.

The embodiments of the invention in which an exclusive property or privilege is claimed are defined as follows:

1. In a process for preparing a halogenated carbanilide of the formula,

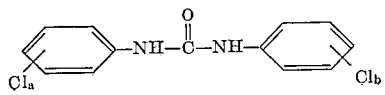

wherein $a$ is an integer from 1 to 3, and $b$ is an integer from 2 to 3, by reacting an amine of the formula

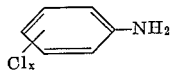

with an isocyanate of the formula

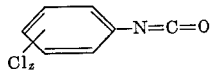

wherein $x$ and $z$ are each integers from 1 to 3, and the sum of $x$ and $z$ is at least 3, the improvement which comprises adding, substantially simultaneously, an o-dichlorobenzene solution of said amine and an o-dichlorobenzene solution of said isocyanate to a reaction vessel, and carrying out the reaction at a temperature of from about 100° C. to about 170° C.

2. A process as defined in claim 1 wherein said reaction is carried out at a temperature of from about 140° C. to about 155° C.

3. A process as defined in claim 1 wherein said reaction vessel is charged with a heel of o-dichlorobenzene prior to the addition of the o-dichlorobenzene solutions.

4. A process as defined in claim 3 wherein the volume of said heel is up to about 20% of the total volume of said o-dichlorobenzene solutions.

5. A process which comprises heating, in a reaction vessel and at a temperature of from about 140° C. to about 155° C., an o-dichlorobenzene solution of 3,4-dichloroaniline with an o-dichlorobenzene solution of p-chlorophenyl isocyanate, said solutions having been added to said vessel substantially simultaneously.

6. A process as defined in claim 5 wherein said vessel is charged with a heel of o-dichlorobenzene prior to the addition of the o-dichlorobenzene solutions.

7. A process as defined in claim 6 wherein said heel is heated to said temperature prior to said addition.

8. A process which comprises heating, in a reaction vessel and at a temperature of from about 140° C. to about 155° C., an o-dichlorobenzene solution of p-chloroaniline with an o-dichlorobenzene solution of 3,4-dichlorophenyl isocyanate, said solutions having been added to said vessel substantially simultaneously.

9. A process as defined in claim 8 wherein said vessel is charged with a heel of o-dichlorobenzene prior to the addition of the o-dichlorobenzene solutions.

10. A process as defined in claim 9 wherein said heel is heated to said temperature prior to said addition.

References Cited by the Examiner

UNITED STATES PATENTS 2,745,874  5/1956  Schetty et al. _____ 260—553
2,818,390  12/1957  Beaver et al. _____ 260—553

ALEX MAZEL, *Primary Examiner.*

HENRY R. JILES, *Examiner.*

JOSEPH A. NARCAVAGE, *Assistant Examiner.*